US008539588B2

(12) United States Patent
Tada et al.

(10) Patent No.: US 8,539,588 B2
(45) Date of Patent: Sep. 17, 2013

(54) APPARATUS AND METHOD FOR SELECTING MEASURE BY EVALUATING RECOVERY TIME

(75) Inventors: Takashi Tada, Kawasaki (JP); Hiroshi Nikaido, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 159 days.

(21) Appl. No.: 12/923,409

(22) Filed: Sep. 20, 2010

(65) Prior Publication Data

US 2011/0016532 A1    Jan. 20, 2011

Related U.S. Application Data

(63) Continuation of application No. PCT/JP2008/055296, filed on Mar. 21, 2008.

(51) Int. Cl.
| G06F 11/00 | (2006.01) |
| G06F 12/14 | (2006.01) |
| G06F 12/16 | (2006.01) |
| G08B 23/00 | (2006.01) |

(52) U.S. Cl.
USPC .......................................................... 726/25

(58) Field of Classification Search
USPC .......................................................... 726/25
See application file for complete search history.

(56) References Cited

U.S. PATENT DOCUMENTS

| 6,374,358 | B1 * | 4/2002 | Townsend ........................ 726/1 |
| 7,360,123 | B1 * | 4/2008 | Westenberg et al. ........ 714/47.2 |
| 8,166,551 | B2 * | 4/2012 | King ............................... 726/25 |
| 2004/0064726 | A1 * | 4/2004 | Girouard ....................... 713/201 |
| 2005/0278786 | A1 * | 12/2005 | Tippett et al. ................ 726/25 |
| 2006/0021050 | A1 * | 1/2006 | Cook et al. ................... 726/25 |

FOREIGN PATENT DOCUMENTS

| JP | 2003-288476 | 10/2003 |
| JP | 2003-308421 | 10/2003 |
| JP | 2004-258816 | 9/2004 |
| JP | 2004-288109 | 10/2004 |
| JP | 2006-48145 | 2/2006 |
| JP | 2006-260250 | 9/2006 |
| JP | 2006-350762 | 12/2006 |
| JP | 2007-35017 | 2/2007 |
| JP | 2007-305067 | 11/2007 |

OTHER PUBLICATIONS

Shuji Harashima et al., "Extending a Concept of Transactions for Business Continuities," IEICE Technical Report, The Institute of Electronics, Information, and Communication Engineers, Jul. 18, 2003, vol. 103, No. 192, p. 61-66.
Tsuyoshi Ito et al., "Fujitsu's Business Continuity Plan Development Methodology," Sep. 2006, vol. 57, No. 5, p. 474-481.
Comments of International Searching Authority, May 3, 2008.
International Search Report for PCT/JP2008/055296, mailed on May 13, 2008.
Japanese Office Action mailed Feb. 14, 2012 issued in corresponding Japanese Patent Application No. 2010-503729.

* cited by examiner

Primary Examiner — Carolyn B Kosowski
(74) Attorney, Agent, or Firm — Staas & Halsey LLP

(57) ABSTRACT

A measure selecting apparatus determines whether a vulnerability of a resource employed in a predetermined task has been addressed or not based on information stored in a memory. When the vulnerability of the resource is determined not to have been addressed and when a recovery time defined in the memory corresponding to the resource is longer than a predetermined time, the measure selecting apparatus evaluates measures defined in the memory corresponding to the vulnerability determined not to have been addressed, and calculates an evaluation value of each measure. The measure selecting apparatus selects a measure with a high evaluation value.

9 Claims, 13 Drawing Sheets

FIG.2

| ID | ADVERSE EVENT | RESOURCE TYPE |
|---|---|---|
| 1 | EARTHQUAKE | INFORMATION SYSTEM, NETWORK, FACILITY/EQUIPMENT, WORKER |
| 2 | AREA POWER FAILURE | INFORMATION SYSTEM, NETWORK, FACILITY/EQUIPMENT |
| 3 | CYBERTERRORISM | INFORMATION SYSTEM, NETWORK |
| 4 | FIRE | INFORMATION SYSTEM, NETWORK, FACILITY/EQUIPMENT, WORKER |

141a

FIG.3

| ID | VULNERABILITY | RESOURCE TYPE | ADVERSE EVENT | RT |
|---|---|---|---|---|
| 1 | EQUIPMENT DAMAGE DUE TO ROLLOVER | INFORMATION SYSTEM | EARTHQUAKE | 5 DAYS |
| 2 | DAMAGE DUE TO VIBRATION | INFORMATION SYSTEM | EARTHQUAKE | 5 DAYS |
| 3 | HDD DAMAGE DUE TO POWER SUPPLY FAILURE | INFORMATION SYSTEM | AREA POWER FAILURE | 5 DAYS |
| 4 | SYSTEM STOP DUE TO POWER SUPPLY FAILURE | INFORMATION SYSTEM | AREA POWER FAILURE | 1 DAY |
| 5 | DATA CORRUPTION DUE TO VIRUS INFECTION | INFORMATION SYSTEM | CYBERTERRORISM | 4 DAYS |
| 6 | EQUIPMENT DAMAGE DUE TO FIRE | INFORMATION SYSTEM | FIRE | 10 DAYS |
| 7 | HIGHLY SKILLED WORKER THAT IS DIFFICULT TO REPLACE | WORKER | * | 120 DAYS |
| 8 | LACK OF DETAILED UNDERSTANDING OF TASK | WORKER | * | 1 DAY |
| 9 | EQUIPMENT BREAKDOWN | NETWORK | EARTHQUAKE, FIRE | 5 DAYS |
| 10 | LINE DISCONNECTION | NETWORK | EARTHQUAKE | 1 DAY |
| 11 | EQUIPMENT STOP DURING POWER FAILURE | NETWORK | AREA POWER FAILURE | 1 DAY |
| 12 | OPERATION STOP DUE TO OVERLOAD ON LINE DURING DISASTER | NETWORK | CYBERTERRORISM | 1 DAY |

141b

FIG.4

| ID | MEASURE | RESOURCE TYPE | ADVERSE EVENT | VULNERABILITY | COST | PERIOD |
|---|---|---|---|---|---|---|
| 1 | SEISMIC RETROFITTING | INFORMATION SYSTEM | EARTHQUAKE | EQUIPMENT DAMAGE DUE TO ROLLOVER | LOW | 1 YEAR |
| 2 | USE EARTHQUAKE-PROOF RACK | INFORMATION SYSTEM | EARTHQUAKE | EQUIPMENT DAMAGE DUE TO ROLLOVER, DAMAGE DUE TO VIBRATION | MEDIUM | 1 MONTH |
| 3 | USE UPS | INFORMATION SYSTEM | AREA POWER FAILURE | HDD DAMAGE DUE TO POWER SUPPLY FAILURE | LOW | 10 DAYS |
| 4 | PRIVATE ELECTRIC GENERATOR | INFORMATION SYSTEM | AREA POWER FAILURE | HDD DAMAGE DUE TO POWER SUPPLY FAILURE, SYSTEM STOP DUE TO POWER SUPPLY FAILURE | HIGH | 1 YEAR |
| 5 | ANTIVIRUS MEASURE | INFORMATION SYSTEM | CYBER-TERRORISM | DATA CORRUPTION DUE TO VIRUS INFECTION | LOW | 5 DAYS |
| 6 | HALON-GAS FIRE-EXTINGUISHING EQUIPMENT | INFORMATION SYSTEM | FIRE | EQUIPMENT DAMAGE DUE TO FIRE | HIGH | 6 MONTHS |
| 7 | SPRINKLER | FACILITY/EQUIPMENT | FIRE | EQUIPMENT DAMAGE DUE TO FIRE | HIGH | 1 YEAR |
| 8 | WORKER ROTATION | WORKER | * | HIGHLY SKILLED WORKER THAT IS DIFFICULT TO REPLACE | LOW | 1 MONTH |
| 9 | TASK MANUAL CREATION | WORKER | * | LACK OF DETAILED UNDERSTANDING OF TASK | LOW | 1 MONTH |
| 10 | BACKUP DEVICE PREPARATION | NETWORK | EARTHQUAKE, FIRE | EQUIPMENT BREAKDOWN | MEDIUM | 1 MONTH |
| 11 | DUAL LINE | NETWORK | EARTHQUAKE | LINE DISCONNECTION | MEDIUM | 3 MONTHS |

141c

FIG.5

| ID | LOCATION |
|---|---|
| 1 | HEAD OFFICE |
| 2 | AA-OFFICE |
| 3 | BB-FACTORY |
| 4 | CC-BUILDING |

| ID | RESOURCE | RESOURCE TYPE | LOCATION | UPPER LEVEL RESOURCE |
|---|---|---|---|---|
| 1 | SHARED FILE SERVER | INFORMATION SYSTEM | BB-FACTORY | - |
| 2 | DEVELOPMENT SERVER | INFORMATION SYSTEM | AA-OFFICE | - |
| 3 | CORPORATE NETWORK | NETWORK | BB-FACTORY | DEVELOPMENT SERVER |
| 4 | SYSTEM ENGINEER | WORKER | BB-FACTORY | SHARED FILE SERVER, CORPORATE NETWORK |

| ID | RESOURCE | MEASURE | PERFORMANCE STATUS |
|---|---|---|---|
| 1 | SHARED FILE SERVER | SEISMIC RETROFITTING | PERFORMED |
| 2 | SHARED FILE SERVER | USE EARTHQUAKE-PROOF RACK | - |
| 3 | SHARED FILE SERVER | USE UPS | PERFORMED |
| 4 | SHARED FILE SERVER | PRIVATE ELECTRIC GENERATOR | - |
| 5 | SHARED FILE SERVER | ANTIVIRUS MEASURE | PERFORMED |
| 6 | SHARED FILE SERVER | HALON-GAS FIRE-EXTINGUISHING EQUIPMENT | - |
| 7 | DEVELOPMENT SERVER | SEISMIC RETROFITTING | PERFORMED |
| 8 | DEVELOPMENT SERVER | USE EARTHQUAKE-PROOF RACK | PERFORMED |
| 9 | DEVELOPMENT SERVER | USE UPS | PERFORMED |
| 10 | DEVELOPMENT SERVER | PRIVATE ELECTRIC GENERATOR | PERFORMED |
| 11 | DEVELOPMENT SERVER | ANTIVIRUS MEASURE | PERFORMED |
| 12 | DEVELOPMENT SERVER | HALON-GAS FIRE-EXTINGUISHING EQUIPMENT | PERFORMED |
| 13 | SYSTEM ENGINEER | WORKER ROTATION | PERFORMED |
| 14 | SYSTEM ENGINEER | TASK MANUAL CREATION | - |
| 15 | CORPORATE NETWORK | BACKUP DEVICE PREPARATION | - |
| 16 | CORPORATE NETWORK | DUAL LINE | PERFORMED |

| ID | SCENARIO | ADVERSE EVENT | AFFECTED AREA |
|---|---|---|---|
| 1 | EARTHQUAKE OCCURRING DIRECTLY BENEATH TOKYO METROPOLITAN AREA | EARTHQUAKE | HEAD OFFICE, AA-OFFICE, BB-FACTORY, CC-BUILDING |
| 2 | XX-DISTRICT POWER FAILURE | AREA POWER FAILURE | HEAD OFFICE, AA-OFFICE |
| 3 | YY-DISTRICT POWER FAILURE | AREA POWER FAILURE | BB-FACTORY, CC-BUILDING |
| 4 | SERVER SABOTAGE | CYBERTERRORISM | HEAD OFFICE, AA-OFFICE, BB-FACTORY, CC-BUILDING |
| 5 | HEAD OFFICE FIRE | FIRE | HEAD OFFICE |
| 6 | AA-OFFICE FIRE | FIRE | AA-OFFICE |
| 7 | BB-FACTORY FIRE | FIRE | BB-FACTORY |
| 8 | CC-BUILDING FIRE | FIRE | CC-BUILDING |

142d

| ID | PERIOD | RTO |
|---|---|---|
| 1 | MARCH 2008 | 10 DAYS |
| 2 | SEPTEMBER 2008 | 6 DAYS |
| 3 | MARCH 2009 | 1 DAY |

142e

| ID | PERIOD | RTO |
|---|---|---|
| 1 | MARCH 2008 | 10 DAYS |
| 2 | SEPTEMBER 2008 | 10 DAYS |
| 3 | MARCH 2009 | 1 DAY |

| ID | SCENARIO | PATH | RTC | RTC PER PERIOD |
|---|---|---|---|---|
| 1 | EARTHQUAKE OCCURRING DIRECTLY BENEATH TOKYO METROPOLITAN AREA | SHARED FILE SERVER, SYSTEM ENGINEER | 6 DAYS | 6 DAYS, 0 DAYS, 0 DAYS |
| 2 | EARTHQUAKE OCCURRING DIRECTLY BENEATH TOKYO METROPOLITAN AREA | DEVELOPMENT SERVER, CORPORATE NETWORK, SYSTEM ENGINEER | 6 DAYS | 6 DAYS, 5 DAYS, 0 DAYS |
| 3 | XX-DISTRICT POWER FAILURE | SHARED FILE SERVER, SYSTEM ENGINEER | 0 DAYS | 0 DAYS, 0 DAYS, 0 DAYS |
| 4 | XX-DISTRICT POWER FAILURE | DEVELOPMENT SERVER, CORPORATE NETWORK, SYSTEM ENGINEER | 0 DAYS | 0 DAYS, 0 DAYS, 0 DAYS |
| 5 | YY-DISTRICT POWER FAILURE | SHARED FILE SERVER, SYSTEM ENGINEER | 1 DAY | 1 DAY, 1 DAY, 1 DAY |
| 6 | YY-DISTRICT POWER FAILURE | DEVELOPMENT SERVER, CORPORATE NETWORK, SYSTEM ENGINEER | 1 DAY | 1 DAY, 1 DAY, 1 DAY |
| 7 | SERVER SABOTAGE | SHARED FILE SERVER, SYSTEM ENGINEER | 0 DAYS | 0 DAYS, 0 DAYS, 0 DAYS |
| 8 | SERVER SABOTAGE | DEVELOPMENT SERVER, CORPORATE NETWORK, SYSTEM ENGINEER | 1 DAY | 1 DAY, 1 DAY, 1 DAY |
| 9 | HEAD OFFICE FIRE | SHARED FILE SERVER, SYSTEM ENGINEER | 0 DAYS | 0 DAYS, 0 DAYS, 0 DAYS |
| 10 | HEAD OFFICE FIRE | DEVELOPMENT SERVER, CORPORATE NETWORK, SYSTEM ENGINEER | 0 DAYS | 0 DAYS, 0 DAYS, 0 DAYS |
| 11 | AA-OFFICE FIRE | SHARED FILE SERVER, SYSTEM ENGINEER | 0 DAYS | 0 DAYS, 0 DAYS, 0 DAYS |
| 12 | AA-OFFICE FIRE | DEVELOPMENT SERVER, CORPORATE NETWORK, SYSTEM ENGINEER | 0 DAYS | 0 DAYS, 0 DAYS, 0 DAYS |
| 13 | BB-FACTORY FIRE | SHARED FILE SERVER, SYSTEM ENGINEER | 11 DAYS | 10 DAYS, 0 DAYS, 0 DAYS |
| 14 | BB-FACTORY FIRE | DEVELOPMENT SERVER, CORPORATE NETWORK, SYSTEM ENGINEER | 6 DAYS | 6 DAYS, 5 DAYS, 0 DAYS |
| 15 | CC-BUILDING FIRE | SHARED FILE SERVER, SYSTEM ENGINEER | 0 DAYS | 0 DAYS, 0 DAYS, 0 DAYS |
| 16 | CC-BUILDING FIRE | DEVELOPMENT SERVER, CORPORATE NETWORK, SYSTEM ENGINEER | 0 DAYS | 0 DAYS, 0 DAYS, 0 DAYS |

| ID | RESOURCE | VULNERABILITY | HANDLING STATUS |
|---|---|---|---|
| 1 | SHARED FILE SERVER | EQUIPMENT DAMAGE DUE TO ROLLOVER | HANDLED |
| 2 | SHARED FILE SERVER | DAMAGE DUE TO VIBRATION | − |
| 3 | SHARED FILE SERVER | HDD DAMAGE DUE TO POWER SUPPLY FAILURE | HANDLED |
| 4 | SHARED FILE SERVER | SYSTEM STOP DUE TO POWER SUPPLY FAILURE | − |
| 5 | SHARED FILE SERVER | DATA CORRUPTION DUE TO VIRUS INFECTION | HANDLED |
| 6 | SHARED FILE SERVER | EQUIPMENT DAMAGE DUE TO FIRE | − |
| 7 | DEVELOPMENT SERVER | EQUIPMENT DAMAGE DUE TO ROLLOVER | HANDLED |
| 8 | DEVELOPMENT SERVER | DAMAGE DUE TO VIBRATION | HANDLED |
| 9 | DEVELOPMENT SERVER | HDD DAMAGE DUE TO POWER SUPPLY FAILURE | HANDLED |
| 10 | DEVELOPMENT SERVER | SYSTEM STOP DUE TO POWER SUPPLY FAILURE | HANDLED |
| 11 | DEVELOPMENT SERVER | DATA CORRUPTION DUE TO VIRUS INFECTION | HANDLED |
| 12 | DEVELOPMENT SERVER | EQUIPMENT DAMAGE DUE TO FIRE | HANDLED |
| 13 | SYSTEM ENGINEER | HIGHLY SKILLED WORKER THAT IS DIFFICULT TO REPLACE | HANDLED |
| 14 | SYSTEM ENGINEER | LACK OF DETAILED UNDERSTANDING OF TASK | − |
| 15 | CORPORATE NETWORK | EQUIPMENT BREAKDOWN | − |
| 16 | CORPORATE NETWORK | LINE DISCONNECTION | HANDLED |
| 17 | CORPORATE NETWORK | EQUIPMENT STOP DURING POWER FAILURE | − |
| 18 | CORPORATE NETWORK | OPERATION STOP DUE TO OVERLOAD ON LINE DURING DISASTER | − |

| ID | SCENARIO | RESOURCE | AFFECTED STATUS | IMPROVEMENT TARGET | RT |
|---|---|---|---|---|---|
| 1 | EARTHQUAKE OCCURRING DIRECTLY BENEATH TOKYO METROPOLITAN AREA | SHARED FILE SERVER | AFFECTED | Y | 5 DAYS |
| 2 | EARTHQUAKE OCCURRING DIRECTLY BENEATH TOKYO METROPOLITAN AREA | DEVELOPMENT SERVER | AFFECTED | Y | 0 DAYS |
| 3 | EARTHQUAKE OCCURRING DIRECTLY BENEATH TOKYO METROPOLITAN AREA | CORPORATE NETWORK | AFFECTED | Y | 5 DAYS |
| 4 | EARTHQUAKE OCCURRING DIRECTLY BENEATH TOKYO METROPOLITAN AREA | SYSTEM ENGINEER | AFFECTED | Y | 1 DAY |
| 5 | XX-DISTRICT POWER FAILURE | SHARED FILE SERVER | – | – | – |
| 6 | XX-DISTRICT POWER FAILURE | DEVELOPMENT SERVER | AFFECTED | N | 0 DAYS |
| 7 | XX-DISTRICT POWER FAILURE | CORPORATE NETWORK | – | – | – |
| 8 | XX-DISTRICT POWER FAILURE | SYSTEM ENGINEER | – | – | – |
| 9 | YY-DISTRICT POWER FAILURE | SHARED FILE SERVER | AFFECTED | N | 1 DAY |
| 10 | YY-DISTRICT POWER FAILURE | DEVELOPMENT SERVER | – | – | – |
| 11 | YY-DISTRICT POWER FAILURE | CORPORATE NETWORK | AFFECTED | N | 1 DAY |
| 12 | YY-DISTRICT POWER FAILURE | SYSTEM ENGINEER | – | – | – |
| 13 | SERVER SABOTAGE | SHARED FILE SERVER | AFFECTED | N | 0 DAYS |
| 14 | SERVER SABOTAGE | DEVELOPMENT SERVER | AFFECTED | N | 0 DAYS |
| 15 | SERVER SABOTAGE | CORPORATE NETWORK | AFFECTED | N | 1 DAY |
| 16 | SERVER SABOTAGE | SYSTEM ENGINEER | – | – | – |
| 17 | HEAD OFFICE FIRE | SHARED FILE SERVER | – | – | – |
| 18 | HEAD OFFICE FIRE | DEVELOPMENT SERVER | – | – | – |
| 19 | HEAD OFFICE FIRE | CORPORATE NETWORK | – | – | – |
| 20 | HEAD OFFICE FIRE | SYSTEM ENGINEER | – | – | – |
| 21 | AA-OFFICE FIRE | SHARED FILE SERVER | – | – | – |
| 22 | AA-OFFICE FIRE | DEVELOPMENT SERVER | AFFECTED | N | 0 DAYS |
| 23 | AA-OFFICE FIRE | CORPORATE NETWORK | – | – | – |
| 24 | AA-OFFICE FIRE | SYSTEM ENGINEER | – | – | – |
| 25 | BB-FACTORY FIRE | SHARED FILE SERVER | AFFECTED | Y | 10 DAYS |
| 26 | BB-FACTORY FIRE | DEVELOPMENT SERVER | – | – | – |
| 27 | BB-FACTORY FIRE | CORPORATE NETWORK | AFFECTED | Y | 5 DAYS |
| 28 | BB-FACTORY FIRE | SYSTEM ENGINEER | AFFECTED | Y | 1 DAY |
| 29 | CC-BUILDING FIRE | SHARED FILE SERVER | – | – | – |
| 30 | CC-BUILDING FIRE | DEVELOPMENT SERVER | – | – | – |
| 31 | CC-BUILDING FIRE | CORPORATE NETWORK | – | – | – |
| 32 | CC-BUILDING FIRE | SYSTEM ENGINEER | – | – | – |

143c

FIG.13
| ID | RESOURCE | MEASURE | IMPROVED RT | PERIOD |
|---|---|---|---|---|
| 1 | SYSTEM ENGINEER | TASK MANUAL CREATION | 1 | MARCH 2008 |
| 2 | SHARED FILE SERVER | USE EARTHQUAKE-PROOF RACK | 5 | SEPTEMBER 2008 |
| 3 | SHARED FILE SERVER | HALON-GAS FIRE-EXTINGUISHING EQUIPMENT | 10 | SEPTEMBER 2008 |
| 4 | CORPORATE NETWORK | BACKUP DEVICE PREPARATION | 5 | MARCH 2009 |
143d
FIG.14A
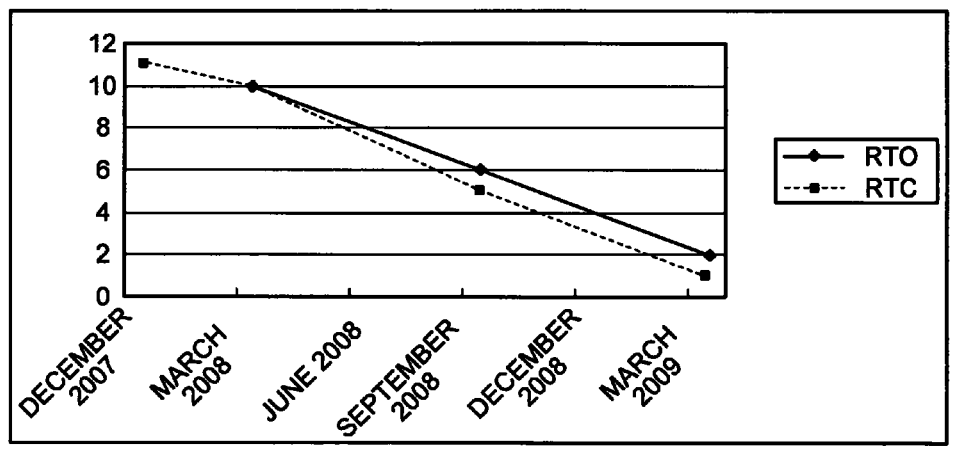
FIG.14B
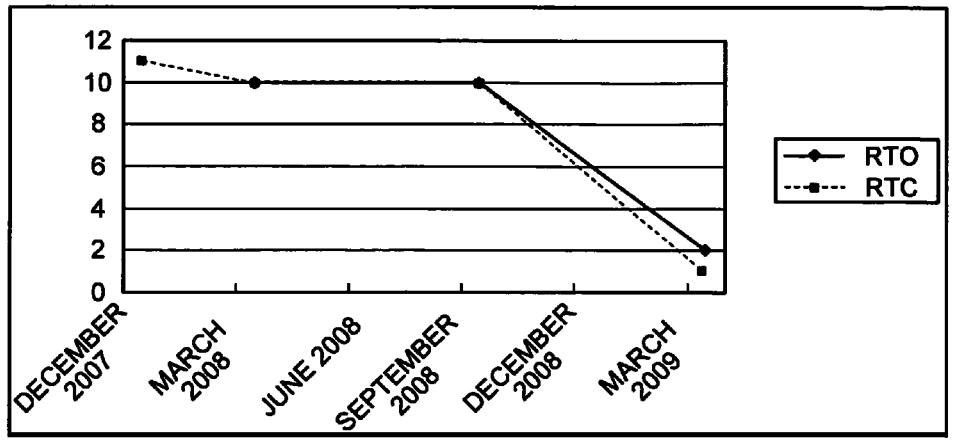

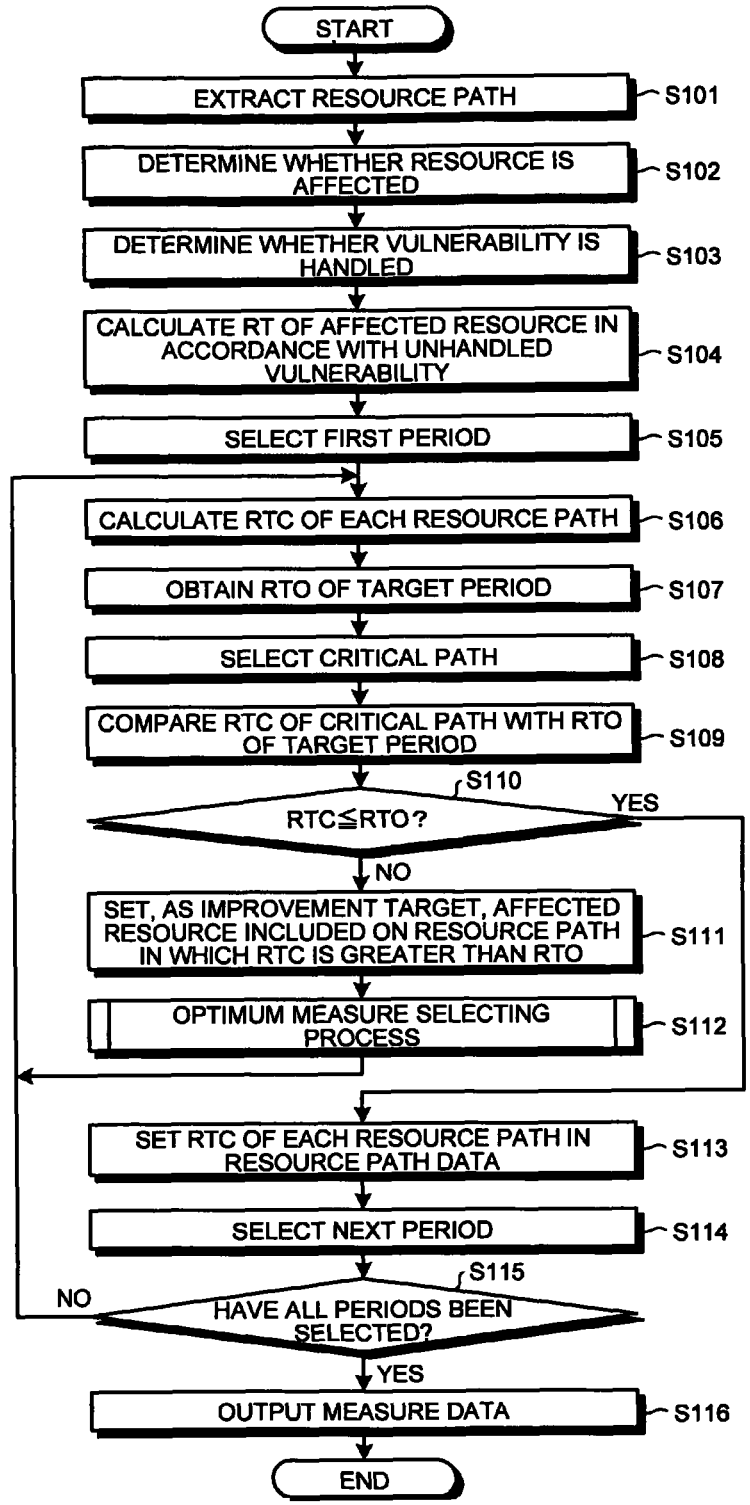

_US 8,539,588 B2_

APPARATUS AND METHOD FOR SELECTING MEASURE BY EVALUATING RECOVERY TIME

CROSS-REFERENCE TO RELATED APPLICATION

This application is a continuation of International Application No. PCT/JP2008/055296, filed on Mar. 21, 2008, the entire contents of which are incorporated herein by reference.

FIELD

The embodiment discussed herein is directed to a measure selecting apparatus and a measure selecting method capable of accurately evaluating the recovery times of tasks.

BACKGROUND

To grasp the contents of tasks of business or improve tasks, there is a known conventional technology for modeling the contents of the tasks and visualize the tasks in the form of a diagram or the like. For example, there is a known technology for visualizing workflows or modeling the contents of tasks to optimize the company activities.

One such aim of modeling the contents of the tasks includes the development of a Business Continuity Plan (BCP). The term BCP is a plan established to allow business to continue as much as possible when various adverse events occur. In BCP development, a diagram referred to an influence diagram is usually created, and, in accordance with the diagram, actions to be taken are extracted or measures to be taken are designed.

A technology for extracting actions to be taken related to disaster or a technology related to designing measures has been known. For Example, with one known technology, disaster measure plans with high cost-effectiveness for business are presented. This is performed by first evaluating the cost-effectiveness of a disaster measure on the basis of the difference in the amount (effect) of loss before and after the disaster measure and on the basis of the total amount of disaster measure cost and then by comparing multiple disaster measure plans. With another known technology, the degree of seriousness is calculated, as a reference, for a disaster that occurs in a certain area. The calculation is performed using actual data about the occurrence/non-occurrence of the disaster and using a boundary that is used to determine the occurrence/non-occurrence of a disaster and that is obtained from data about the cause of the occurrence of a disaster in each area. These technologies are disclosed in for example Japanese Laid-open Patent Publication Nos. 2003-308421, 2006-048145, 2006-350762 and 2007-35017.

SUMMARY

According to an aspect of an embodiment of the invention, a measure selecting apparatus includes a vulnerability information storing unit that stores therein vulnerability information that defines a resource, a vulnerability of the resource, and a recovery time so that the resource, the vulnerability, and the recovery time are associated with one another; a measure status information storing unit that stores therein measure information and measure status information, the measure information defining a vulnerability defined in the vulnerability information and a measure for eliminating the vulnerability so that the vulnerability and the measure are associated with each other, the measure status information defining a performance status of each measure defined in the measure information; a vulnerability handling determining unit that determines, based on the vulnerability information and the measure status information, a handling status of each vulnerability of a resource included in a task that is used to develop a measure; and a measure selecting unit that selects a measure, from among measures defined in the measure information, based on a recovery time that is stored in the vulnerability information storing unit and is associated with a vulnerability that is determined to have not been handled by the vulnerability handling determining unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 2 is a schematic diagram illustrating an example of adverse event master data;

FIG. 3 is a schematic diagram illustrating an example of vulnerability master data;

FIG. 4 is a schematic diagram illustrating an example of measure master data;

FIG. 5 is a schematic diagram illustrating an example of location data;

FIG. 6 is a schematic diagram illustrating an example of resource data;

FIG. 7 is a schematic diagram illustrating an example of measure status data;

FIG. 8 is a schematic diagram illustrating an example of scenario data;

FIG. 10 is a schematic diagram illustrating an example of resource path data;

FIG. 11 is a schematic diagram illustrating an example of vulnerability handling status data;

FIG. 12 is a schematic diagram illustrating an example of resource RT data;

FIG. 13 is a schematic diagram illustrating an example of measure data;

FIG. 14A is a schematic diagram illustrating an example of a graph displayed by a result output unit;

FIG. 14B is a schematic diagram illustrating another example of a graph displayed by the result output unit;

FIG. 15 is a flowchart illustrating the flow of a process performed by the measure selecting apparatus;

DESCRIPTION OF EMBODIMENT

With the technologies described in Japanese Laid-open Patent Publication Nos. 2003-308421, 2006-048145, 2006-

350762 and 2007-35017, measures to be taken against the various adverse events have not sufficiently been designed from the viewpoint of business continuation. Specifically, to develop a BCP, it is necessary to appropriately evaluate the recovery time when an adverse event occurs; however, with the technologies described in Japanese Laid-open Patent Publication Nos. 2003-308421, 2006-048145, 2006-350762 and 2007-35017, the recovery time cannot be sufficiently evaluated.

Accordingly, the recovery time at the time of the occurrence of an adverse event is evaluated by, for example, consultants with specialized expertise. However, evaluation results vary in accordance with evaluators due to their different experiences, which is inevitable. Accuracy of evaluation of the recovery time at the time of the occurrence of an adverse event affects the effectiveness of measures to be developed; therefore, a technology for uniformly evaluating the recovery time is strongly desired.

According to an aspect of the present invention, if vulnerability information and measure information are appropriately defined in advance, the recovery time can be evaluated by simply checking a performance status of a measure. Accordingly, the recovery time can be accurately evaluated.

A preferred embodiment of the present invention will be explained with reference to accompanying drawings. The present invention is not limited to the embodiment described below.

Figure 18:
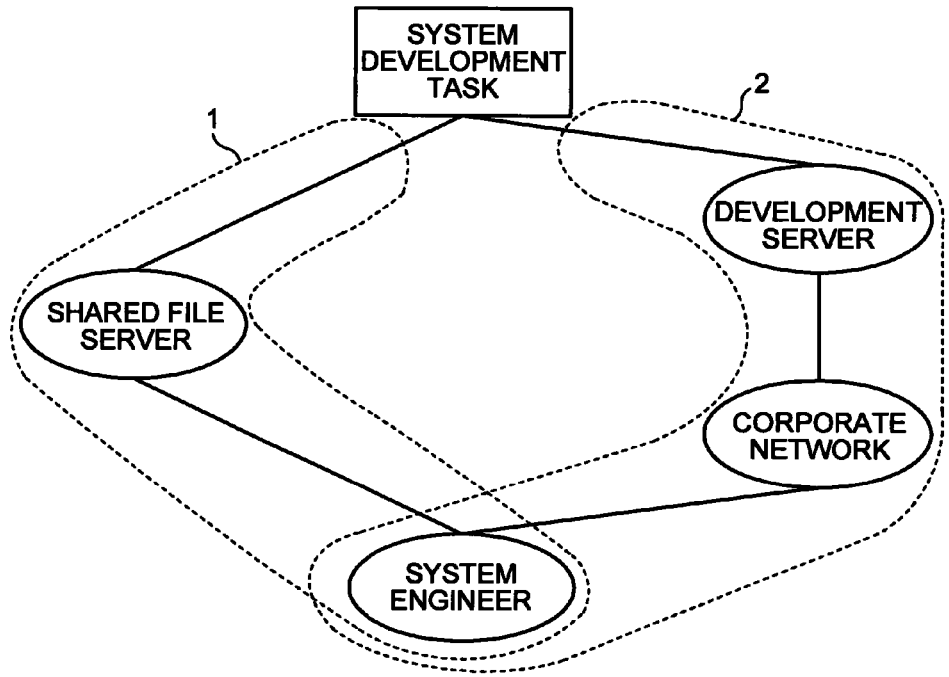
FIG. 18 is a schematic diagram illustrating an example of an influence diagram.

First, BCP development and an influence diagram will be described. FIG. 18 is a schematic diagram illustrating an example of an influence diagram. As illustrated in FIG. 18, in the influence diagram that is used in the BCP, the dependency relation between resources required for performing business is diagrammed. The influence diagram is used to evaluate, in terms of recovery time, the impact of various kinds of adverse events that occur during continuation of business.

The influence diagram illustrated in FIG. 18 indicates that a task named "system development task" depends on resources named "shared file server" and "development server". Furthermore, in the influence diagram, a resource named "shared file server" depends on a resource named "system engineer"; the resource named "development server" depends on a resource named "corporate network"; and the resource named "corporate network" depends on the resource named "system engineer".

The recovery time of a task at the time of the occurrence of an adverse event is calculated in accordance with the recovery time of each resource path obtained from the influence diagram. The resource path is a path joining, in accordance with the dependency relation, resources from the highest level to the end level included in the influence diagram. In the case of the influence diagram illustrated in FIG. 18, two resource paths are present: a resource path 1 obtained by joining the "shared file server" and the "system engineer"; and a resource path 2 obtained by joining the "development server", the "corporate network", and the "system engineer".

The recovery time of a resource path is calculated in accordance with the recovery time of each resource included on the resource path. On the resource path 1, because the "shared file server" depends on the "system engineer", the "shared file server" cannot recover unless the "system engineer" is recovered. Accordingly, the recovery time of the resource path 1 is the sum of the recovery time of the "shared file server" and the recovery time of the "system engineer".

Furthermore, on the resource path 2, because the "development server" depends on the "corporate network", the "development server" cannot recover unless the "corporate network" is recovered, and, because the "corporate network" depends on the "system engineer", the "corporate network" cannot recover unless the "system engineer" is recovered. Accordingly, the recovery time of the resource path 2 is the sum of the recovery time of the "development server", the recovery time of the "corporate network", and the recovery time of the "system engineer".

Furthermore, for example, if a "backup network" can be used as a replacement for the "corporate network", it is possible to recover the "development server" on an upper level if either one of the "corporate network" and the "backup network" is recovered. In this way, if there is any replaceable resource, the recovery time of that portion is calculated as a minimum value of the recovery time of a resource that can be replaced.

Because the task named "system development task" illustrated in FIG. 18 depends on the resource named "shared file server" and the resource named "development server", the "system development task" cannot recover until both of these two resources are recovered. Accordingly, the recovery time of the task named "system development task" is calculated as the sum of a maximum value of the recovery time of the resource path 1 including the "shared file server" and a maximum value of the recovery time of the resource path 2 including the "development server".

As described above, the recovery time of a task can be obtained by calculating the recovery time of each resource path included in the task and obtaining the maximum value thereof. Then, the recovery time of each resource path is calculated in accordance with the recovery time of each resource.

To shorten the recovery time of a task, it is necessary to shorten the recovery time of a resource included in the task. In general, a lot of resources are included in the task, and, furthermore, multiple measures are possibly present for each resource; therefore, there are a lot of possible combinations of measures. To develop a BCP, it is necessary to select an optimum combination from among a lot of combinations of measures. A measure selecting apparatus 10 according to the embodiment supports an operation in such a manner that a combination can easily be selected.

To effectively develop a BCP, in principle, it is necessary to accurately evaluate both the recovery time of each resource and the reduction improvement in the length of recovery time of each measure. The evaluation result possibly varies depending on the person in charge of the evaluation. However, with the measure selecting apparatus 10 according to the embodiment, it is possible to reduce the variation in the evaluation result by evaluating, in accordance with information in which a vulnerability and the recovery time associated with the vulnerability is defined for each resource type, the recovery time of a resource and the reduction improvement in the length of recovery time obtained by using each measure.

In the following, the configuration of the measure selecting apparatus 10 according to the embodiment will be described. The measure selecting apparatus 10 is an apparatus that selects an optimum combination of measures in such a manner that recovery time capability (hereinafter, referred to as "RTC"), which corresponds to the recovery time of business assumed at the time of the occurrence of an adverse event such as an earthquake, is less than a recovery time objective (hereinafter, referred to as "RTO").

Figure 1:
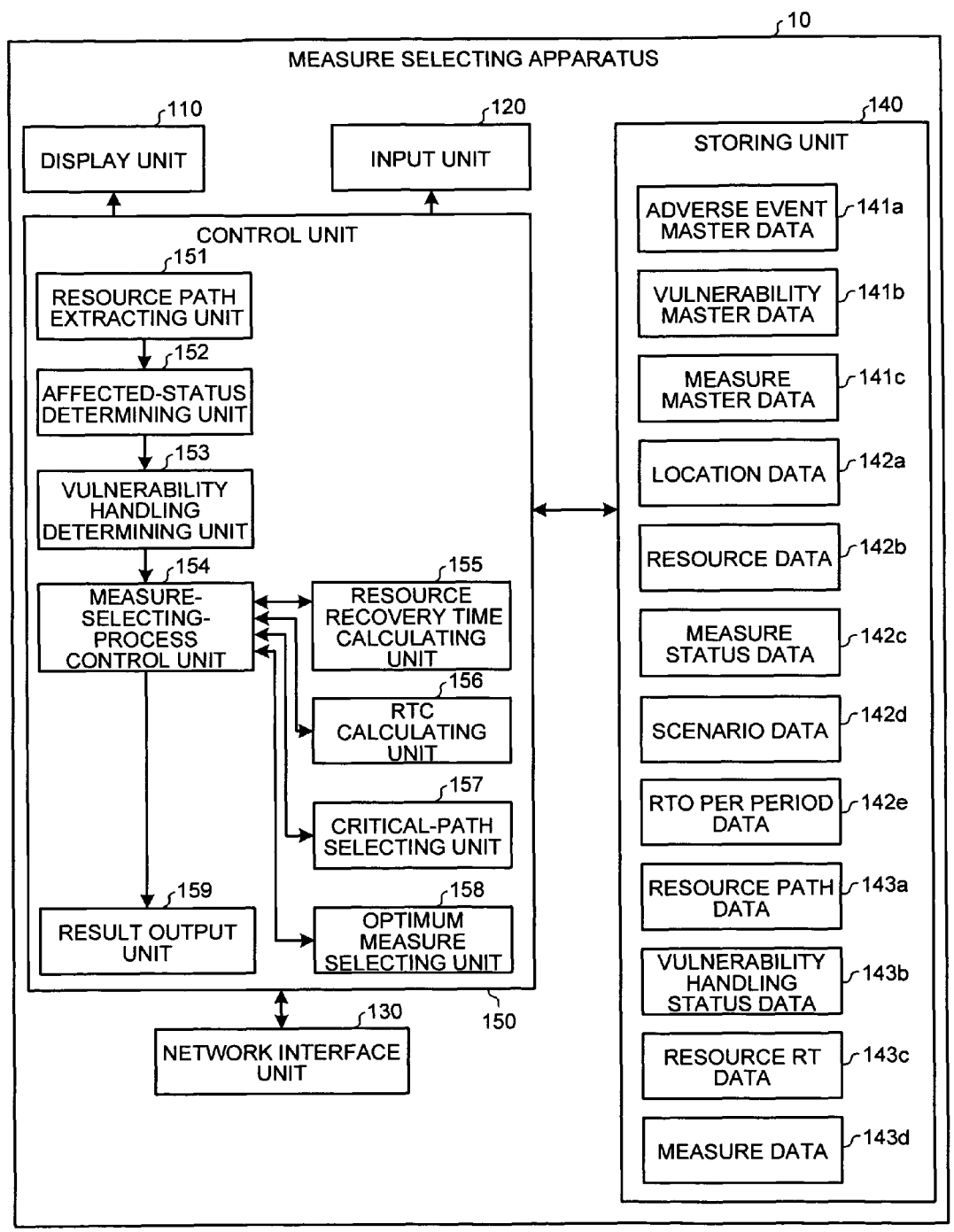
FIG. 1 is a functional block diagram illustrating the configuration of a measure selecting apparatus according to an embodiment.

FIG. 1 is a functional block diagram illustrating the configuration of the measure selecting apparatus 10 according to the embodiment. As illustrated in FIG. 1, the measure selecting apparatus 10 includes a display unit 110, an input unit 120, a network interface unit 130, a storing unit 140, and a control unit 150.

The display unit 110 displays various kinds of information and is, for example, a liquid crystal display. The input unit 120 is a unit to which a user inputs various kinds of instruction and includes a keyboard, a mouse, and the like. The network interface unit 130 is an interface for exchanging information or the like with another device via a network.

The storing unit 140 is a storing unit that stores various kinds of information. The storing unit 140 stores therein adverse event master data 141a, vulnerability master data 141b, measure master data 141c, location data 142a, resource data 142b, measure status data 142c, scenario data 142d, RTC per period data 142e, resource path data 143a, vulnerability handling status data 143b, resource RT data 143c, and measure data 143d.

The adverse event master data 141a contains information in which possible adverse events that occur with respect to tasks and resource types that are affected by those adverse events are defined in an associated manner. An example of the adverse event master data 141a is illustrated in FIG. 2. As illustrated in FIG. 2, the adverse event master data 141a includes columns such as ID, adverse event, and resource type.

The column entitled "ID" contains identification numbers for identifying each row. The column entitled "adverse event" contains adverse events that possibly occurs with respect to a task. The column entitled "resource type" contains a list of types of resource affected by an adverse event. In a first row in the adverse event master data 141a illustrated in FIG. 2, it is indicated that an adverse event named "earthquake" affects four resource types named "information processing system", "network", "facility/equipment", and "worker".

The vulnerability master data 141b is information in which a vulnerability of a resource and the recovery time (hereinafter referred to as "RT") of a resource associated with the vulnerability are defined in an associated manner. An example of the vulnerability master data 141b is illustrated in FIG. 3. As illustrated in FIG. 3, the vulnerability master data 141b includes columns such as an ID, a vulnerability, a resource type, an adverse event, and an RT.

The column entitled "ID" contains identification numbers for identifying each row. The column entitled "vulnerability" contains items to which a resource is vulnerable. The column entitled "resource type" contains resource types. The column entitled "adverse event" contains a list of adverse events to which a resource is vulnerable and that adversely affect the resource. If an adverse event that adversely affects a resource is unspecified, symbol "*" is stored as an item in the adverse event column. The column entitled "RT" contains RTs associated with a vulnerability.

In a first row of the vulnerability master data 141b illustrated in FIG. 3, it is indicated that a resource type named "information system" has a vulnerability named "equipment damage due to rollover" with respect to an adverse event named "earthquake". It is also indicated that that RT associated with this vulnerability is "five days". Furthermore, in a seventh row in the vulnerability master data 141b illustrated in FIG. 3, it is indicated that a resource type named "worker" has a vulnerability named "highly skilled worker that is difficult to replace" with respect to an unspecified adverse event. It is also indicated that the RT associated with this vulnerability is "120 days".

As in the example illustrated in FIG. 3, in the vulnerability master data 141b, multiple vulnerabilities can be defined with respect to the same combination of resource type and adverse event. Furthermore, a different RT can be defined, for each vulnerability, with respect to the same combination of resource type and adverse event.

The measure master data 141c is information in which a measure that is used to eliminate a vulnerability and a cost or the like required for performing that measure are defined in an associated manner. An example of the measure master data 141c is illustrated in FIG. 4. As illustrated in FIG. 4, the measure master data 141c includes columns such as ID, measure, resource type, adverse event, vulnerability, cost, and period.

The column entitled "ID" contains identification numbers for identifying each row. The column entitled "measure" contains measures that are used to eliminate a vulnerability of a resource. The column entitled "resource type" contains resource types. The column entitled "adverse event" contains a list of adverse events to which a resource is vulnerable and that adversely affect the resource. If an adverse event that adversely affects a resource is unspecified, symbol "*" is stored as an item in the adverse event column. The column entitled "vulnerability" contains a list of vulnerabilities that are eliminated by a measure. The column entitled "cost" contains the cost of performing a measure. The column entitled "period" contains the period of time required for performing a measure.

In a first row in the measure master data 141c illustrated in FIG. 4, it is indicated that a resource type named "information system" has a vulnerability named "equipment damage due to rollover" with respect to an adverse event named "earthquake". It is also indicated that a measure named "seismic retrofitting" is present with respect to the vulnerability, and it is indicated that, in order to perform the measure, a "low" cost and a period of "one year" is needed.

As in the example illustrated in FIG. 4, in the measure master data 141c, a different measure can be defined with respect to the same vulnerability. Furthermore, in the example illustrated in FIG. 4, the value of the cost is stored as "low", "medium", or "high". However, alternatively, an actual amount can be stored therein as a cost.

The items defined in the adverse event master data 141a, the vulnerability master data 141b, and the measure master data 141c are not limited to a specific task. Accordingly, by comprehensively defining conceivable adverse events, vulnerabilities, measures, or the like, it is possible to handle various tasks without any changes. Furthermore, it is, of course, possible to add, to the master data, a defined content intended for a specific task.

The location data 142a contains a list of locations related to a task that is used to develop a BCP. An example of the location data 142a is illustrated in FIG. 5. In the example of the location data 142a illustrated in FIG. 5, as a location related to a task that is used to develop a BCP, four locations are represented: "head office", "AA-office", "BB-factory", and "CC-building".

The resource data 142b contains a list of all the resources included in a task that is used to develop a BCP. An example of the resource data 142b is illustrated in FIG. 6. As illustrated in FIG. 6, the resource data 142b includes columns such as an ID, a resource, a resource type, a location, and an upper level resource.

The column entitled "ID" contains identification numbers for identifying each row. The column entitled "resource" contains resources included in tasks that are used to develop BCPs. The column entitled "resource type" contains resource types. The column entitled "location" contains locations where a resource is located. The column entitled "upper level resource" contains a list of other resources that depends on the target resource. If there is no resource that depends on the target resource, the entry in the upper level resource column is blank.

In the example of the resource data 142b illustrated in FIG. 6, resources, which are included in the task represented in the influence diagram illustrated in FIG. 18, are listed. In a first row in the resource data 142b illustrated in FIG. 6, it is indicated that a resource named "shared file server" is included in a task that is used to develop a BCP; that the resource belongs to a resource type named "information system"; and that the resource is located at the "BB-factory". It is also indicated that there is no resources that depends on this resource, i.e., this resource is a resource located at the highest level of the resource path. In a fourth row in the resource data 142b illustrated in FIG. 6, it is indicated that a resource named "system engineer" is included in a task that is used to develop a BCP; that this resource belongs to a resource type named "worker" and is located at the "BB-factory"; and that two resources named "shared file server" and "corporate network" depend on this resource.

The measure status data 142c is information indicating the performance status of a measure in a task that is used to develop a BCP. An example of the measure status data 142c is illustrated in FIG. 7. As illustrated in FIG. 7, the measure status data 142c includes columns such as ID, resource, measure, and performance status.

The column entitled "ID" contains identification numbers for identifying each row. The column entitled "resource" contains resources included in tasks that are used to develop BCPs. The column entitled "measure" contains measures that are used to eliminate a vulnerability of a resource. The column entitled "performance status" contains values indicating whether a measure has been completed.

A combination of a resource and a measure in the measure status data 142c is created in accordance with the measure master data 141c and the resource data 142b. Specifically, from among combinations of a resource in the resource data 142b and a measure in the measure master data 141c, items of the same resource types associated with those combinations are all extracted to create a combination of a resource and a measure in the measure status data 142c. Furthermore, the performance status is determined in accordance with the result of examining whether, for the created combinations of the resource and the measure, the measure is actually performed on the resource.

The scenario data 142d is information related to a conceivable adverse event scenario when a BCP development is designed. An example of the scenario data 142d will be illustrated in FIG. 8. As illustrated in FIG. 8, the scenario data 142d includes columns such as ID, scenario, adverse event, and affected area.

The column entitled "ID" contains identification numbers for identifying each row. The column entitled "scenario" contains names of adverse event scenarios. The column entitled "adverse event" contains adverse events that can conceivably occur in the adverse event scenario. The column entitled "affected area" contains a list of locations conceivably affected by an adverse event.

In a first row in the scenario data 142d illustrated in FIG. 8, it is indicated that, in an adverse event scenario named "earthquake occurring directly beneath Tokyo metropolitan area", four locations, named "head office", "AA-office", "BB-factory", and "CC-building", are affected by an adverse event named "earthquake". Furthermore, a seventh row in FIG. 8, it is indicated that, in an adverse event scenario named "BB-factory fire", a location named "BB-factory" is assumed to be affected by an adverse event named "fire".

Figure 9A:
FIG. 9A is a schematic diagram illustrating an example of RTC per period data.

The RTC per period data 142e is information about an RTO. An example of the RTC per period data 142e is illustrated in FIG. 9A. In the example of the RTC per period data 142e illustrated in FIG. 9A, it is indicated that an RTO as of "March in 2008" is set to "10 days", an RTO as of "September in 2008" is set to "six days", and an RTO as of "March in 2009" is set to "one day". In this way, in the RTC per period data 142e, an RTO is set for each period.

The location data 142a, the resource data 142b, the measure status data 142c, the scenario data 142d, and the RTC per period data 142e are prepared, in accordance with a task that is used to develop a BCP, by the measure selecting apparatus 10 before it performs a process for selecting a measure.

The resource path data 143a is information in which an RTC of a resource path is stored for each adverse event scenario. An example of the resource path data 143a is illustrated in FIG. 10. As illustrated in FIG. 10, the resource path data 143a includes columns such as ID, scenario, a path, RTC, and RTC per period.

The column entitled "ID" contains identification numbers for identifying each row. The column entitled "scenario" contains names of adverse event scenarios. The column entitled "path" contains, as a list of resources included on resource paths, the resource path extracted from the scenario data 142d. The column entitled "RTC" contains the initial RTC of resource paths of adverse events that conceivably occur in adverse event scenarios. The column entitled "RTC per period" contains, as a list of RTCs, changes in RTCs obtained when a measure selected by the measure selecting apparatus 10 is performed. Each RTC that is included in the list stored in the RTC per period column corresponds to an RTO that is illustrated next to a period defined in the RTC per period data 142e.

A combination of an adverse event scenario and a path in the resource path data 143a is created on the basis of the scenario data 142d and the resource data 142b. Specifically, in accordance with the value of a resource item and the value of an upper level resource item in each row, all resource paths are extracted from the resource data 142b. Then, combinations of all of the extracted resource paths and all the adverse event scenarios registered in the scenario data 142d are registered in the resource path data 143a.

In a first row in the resource path data 143a illustrated in FIG. 10, it is indicated that an RTC of a resource path having a resource named "shared file server" and a resource named "system engineer" is set to "six days" with respect to an adverse event scenario named "earthquake occurring directly beneath Tokyo metropolitan area". It is also indicated that, if a measure selected by the measure selecting apparatus 10 is performed, each of the RTCs defined in the RTC per period data 142e change to "six days", "zero days", and "zero days".

The vulnerability handling status data 143b contains information in which the performance status of a measure with respect to various kinds of vulnerability of a resource. An example of the vulnerability handling status data 143b is illustrated in FIG. 11. As illustrated in FIG. 11, the vulnerability handling status data 143b includes columns such as ID, resource, vulnerability, and handling status.

The column entitled "ID" contains identification numbers for identifying each row. The column entitled "resource" contains resources included in tasks that are used to develop BCPs. The column entitled "vulnerability" contains items to which a resource is vulnerable. The column entitled "measure status" contains values indicating whether a handling with respect to a vulnerability has already been performed.

A combination of a resource and a vulnerability in the vulnerability handling status data 143b is created in accordance with the resource data 142b and the vulnerability master data 141b. Specifically, from among combinations of a resource in the resource data 142b and a vulnerability in the vulnerability master data 141*b*, items of the same resource type associated with those combinations are all extracted to create a combination of a resource and a vulnerability in the vulnerability handling status data 143*b*.

Furthermore, the handling status is set on the basis of the measure status data 142*c* and the measure master data 141*c*. For example, by referring to a first row in the measure status data 142*c* illustrated in FIG. 7, it can be seen that a measure named "seismic retrofitting" has been performed with respect to a resource named "shared file server". By referring to the measure master data 141*c* illustrated in FIG. 4, it can be seen that a vulnerability named "equipment damage due to rollover" is eliminated by a measure named "seismic retrofitting". Thus, in a first row in the vulnerability handling status data 143*b* illustrated in FIG. 11, a value indicating that a handling with respect to a vulnerability named "equipment damage due to rollover" included in a resource named "shared file server" is set as an item in the handling status column.

The resource RT data 143*c* is information in which an RT of a resource is stored for each adverse event scenario. An example of the resource RT data 143*c* is illustrated in FIG. 11. As illustrated in FIG. 11, the resource RT data 143*c* includes columns such as ID, scenario, resource, affected status, improvement target, and RT.

The column entitled "ID" contains identification numbers for identifying each row. The column entitled "scenario" contains names of adverse event scenarios. The column entitled "resource" contains resources included in tasks that are used to develop BCPs. The column entitled "affected status" contains values indicating whether, if an adverse event that is assumed to occur in an adverse event scenario, a resource is adversely affected. The column entitled "improvement target" contains values indicating whether a resource is an improvement target, i.e., whether an RTC is included in a resource path in which the RTC exceeds the RTO. The column entitled "RT" contains items of an RT of a resource.

A combination of an adverse event scenario and a resource in the resource RT data 143*c* is created on the basis of the scenario data 142*d* and the resource data 142*b*. Specifically, combinations of a resource registered in the resource data 142*b* and an adverse event scenario registered in the scenario data 142*d* are all registered in the resource RT data 143*c*.

Furthermore, an RT in the resource RT data 143*c* is calculated in accordance with an unhandled vulnerability. For example, a first row illustrated in FIG. 11 stores therein an RT of a resource named "shared file server" with respect to an adverse event scenario named "earthquake occurring directly beneath Tokyo metropolitan area". By referring to the resource data 142*b* illustrated in FIG. 6, it can be seen that a resource named "shared file server" corresponds to a resource type named "information system". Furthermore, by referring to the scenario data 142*d* illustrated in FIG. 8, it can be seen that an adverse event that is assumed to occur in an adverse event scenario named "earthquake occurring directly beneath Tokyo metropolitan area" is an "earthquake".

By referring to the vulnerability master data 141*b* illustrated in FIG. 3, it can be seen that a resource type named "information system" has two types of vulnerability, named "equipment damage due to rollover" and "damage due to vibration", with respect to an adverse event named "earthquake". It can also be seen that the RT associated with each vulnerability is five days. By further referring to the vulnerability handling status data 143*b* illustrated in FIG. 11, it can be seen that a measure has been performed on the vulnerability named "equipment damage due to rollover" contained in a resource named "shared file server" and it can be seen that this vulnerability has been eliminated.

In this way, by referring to the various kinds of data, it can be seen that an unhandled vulnerability of a resource named "shared file server" in an adverse event scenario named "earthquake occurring directly beneath Tokyo metropolitan area" is only "damage due to vibration". The RT of "five days" associated with this vulnerability corresponds to an RT of a resource named "shared file server". Furthermore, if multiple unhandled vulnerabilities are present, the sum of the RTs associated with these vulnerabilities is the RT of the resource. Accordingly, if no measure is performed on a resource named "shared file server", the RT of a resource named "shared file server" in an adverse event scenario named "earthquake occurring directly beneath Tokyo metropolitan area" is "10 days", which is the sum of the RTs associated with the above two vulnerabilities.

As described above, both the vulnerability master data 141*b*, in which an RT associated with a vulnerability is defined, and the measure master data 141*c*, in which a measure that eliminates a vulnerability is defined, can be defined in such a manner that tasks are arbitrarily selected. Furthermore, the measure status data 142*c* that indicates a performance status of a measure can be set in accordance with the current status. Accordingly, by calculating, in accordance with an unhandled vulnerability, the RT of a resource using the measure selecting apparatus 10, it is possible to accurately evaluate RTs of various resources by avoiding variation in the evaluation result due to the different experiences of evaluators.

The measure data 143*d* is information on a measure selected by the measure selecting apparatus 10. An example of the measure data 143*d* is illustrated in FIG. 13. As illustrated in FIG. 13, the measure data 143*d* includes columns such as ID, resource, measure, improved RT, and period.

The column entitled "ID" contains identification numbers for identifying each row. The column entitled "resource" contains resources to be performed on selected measures. The column entitled "measure" contains items of a selected measure. The column entitled "improved RT" contains the lengths of RTs that are further improved because of a selected measure being performed. For example, if a certain resource has four vulnerabilities and if two vulnerabilities are further eliminated by performing the selected measure, the sum of values defined in the vulnerability master data 141*b* as an RT associated with the vulnerabilities is stored in an item in the improved RT column. The column entitled "period" contains periods during which a measure is performed. The period corresponds to the period column in the RTC per period data 142*e*.

When the measure selecting apparatus 10 performs a process for selecting a measure, the measure selecting apparatus 10 creates the resource path data 143*a*, the resource RT data 143*c*, the vulnerability handling status data 143*b*, and the measure data 143*d*.

By referring back to FIG. 1, it can be seen that the control unit 150 is a control unit that performs the overall control of the measure selecting apparatus 10. The control unit 150 has a resource path extracting unit 151, an affected-status determining unit 152, a vulnerability handling determining unit 153, a measure-selecting-process control unit 154, a resource recovery time calculating unit 155, an RTC calculating unit 156, a critical-path selecting unit 157, an optimum measure selecting unit 158, and a result output unit 159.

The resource path extracting unit 151 extracts all resource paths from the resource data 142*b* and creates resource path data 143*a* illustrated in FIG. 10 by combining the extracted resource path and an adverse event scenario registered in the scenario data 142d. At the stage when the resource path extracting unit 151 creates the resource path data 143a, entries in the RTC column and the RTC per period column are blank.

The affected-status determining unit 152 creates a combination of an adverse event scenario and a resource on the basis of the scenario data 142d and the resource data 142b. On the basis of the scenario data 142d and the adverse event master data 141a, the affected-status determining unit 152 further determines whether a resource that is combined with an adverse event scenario is damaged and then creates the resource RT data 143c like that illustrated in FIG. 12.

If a location where a resource is located is one of the affected areas in an adverse event scenario in the scenario data 142d, and in addition, if an adverse event assumed to occur in the adverse event scenario is defined, in the adverse event master data 141a, that the adverse event affects a resource having the same type of resource as that resource in the affected area, the affected-status determining unit 152 determines that that resource is affected in that adverse event scenario. At the stage when the affected-status determining unit 152 creates the resource RT data 143c, entries in the improvement target column and the RT column are blank.

The vulnerability handling determining unit 153 creates, on the basis of the resource data 142b and the vulnerability master data 141b, a combination of a resource and a vulnerability; determines, on the basis of the measure status data 142c and the measure master data 141c, a handling performance status with respect to a vulnerability of the created combination; and creates the vulnerability handling status data 143b like that illustrated in FIG. 11.

The measure-selecting-process control unit 154 controls the resource recovery time calculating unit 155, the RTC calculating unit 156, the critical-path selecting unit 157, and the optimum measure selecting unit 158 so as to select an optimum measure in such a manner that an RTO for each period registered in the RTC per period data 142e is satisfied. Specifically, the measure-selecting-process control unit 154 gradually changes, on the basis of the RTC per period data 142e, the period and the RTO and selects an optimum measure, from among feasible measures in each period, that agree with the RTO of that period.

For measures for eliminating vulnerability, in some cases, there may be a measure that is required for a long period of time, for example, personnel training. In such a case, by setting an RTO for each period and selecting a measure, it is possible to create a long-range plan by taking into consideration the time required for implementation. Furthermore, with a method of designing a target setting and an action plan for each period in this way, it is easy to fit them in with company activities in which a task plan is implemented in each predetermined period, such as quarterly.

The resource recovery time calculating unit 155 calculates the RT of a resource in accordance with an unhandled vulnerability, as described above. The RTC calculating unit 156 calculates the RTC of each path included in the resource path data 143a. Specifically, the RTC calculating unit 156 extracts a combination of a resource, which is one of the resources in the path column in the resource path data 143a, and an adverse event scenario, which is in the scenario column in the resource path data 143a and is in the same row of the target resource; obtains, from the resource RT data 143c, RTs corresponding to these combinations; and defines the sum of the RTs as an RTC of a resource path.

For example, from a first row in the resource path data 143a illustrated in FIG. 10, two combinations can be obtained: a combination of an adverse event scenario named "earthquake occurring directly beneath Tokyo metropolitan area" and a resource named "shared file server" and a combination of the adverse event scenario named "earthquake occurring directly beneath Tokyo metropolitan area" and a resource named "system engineer". By referring to the resource RT data 143c illustrated in FIG. 12, RTs of "five days" and "one day" can be obtained for each combination. In such a case, the RTC calculating unit 156 outputs "six days", which is the sum of the above RTs, as an RTC of a resource path that is stored in the first row in the resource path data 143a illustrated in FIG. 10.

The critical-path selecting unit 157 compares the RTC of each resource path calculated by the RTC calculating unit 156 and selects a critical path. The term critical path means a resource path having the maximum RTC calculated by the RTC calculating unit 156.

The optimum measure selecting unit 158 selects resources included on a resource path in which the RTC exceeds the RTO. Then, the optimum measure selecting unit 158 selects, from among measures that can be performed within the target period, the most effective measure in order to eliminate an unhandled vulnerability obtained by those resources. A process for selecting the most effective measure in detail will be described later.

The result output unit 159 outputs information on a measure selected by the measure-selecting-process control unit 154. Specifically, by displaying data stored in the measure data 143d, the result output unit 159 displays all of the measures selected by the measure-selecting-process control unit 154, and also displays, as a graph, a change in the RTC for each period that is set in the resource path data 143a.

An example graph displayed by the result output unit 159 is illustrated in FIG. 14A. In the graph illustrated in FIG. 14A, a change in the RTO, for each period, that is set in the RTC per period data 142e illustrated in FIG. 9A and a change in the RTC, for each period, that is set in the resource path data 143a illustrated in FIG. 10 are represented as a line graph. As illustrated in FIG. 14A, an RTC in each period after a measure is performed is equal to or less than each RTO. The RTCs represented in this graph are RTCs per each task, and each of the RTCs is calculated as a maximum value of an RTC for each resource path.

Figure 9B:
FIG. 9B is a schematic diagram illustrating another example of RTC per period data.

The shape of the graph varies in accordance with a content that is set in the RTC per period data 142e. For example, if the RTC per period data 142e is set like that illustrated in FIG. 9B, because the RTO in a first period and a second period have the same RTO, a new measure does not need to be completed in the second period. Therefore, the line between the first and the second periods in the graph becomes flat.

In the following, the flow of the process performed by the measure selecting apparatus 10 will be described. FIG. 15 is a flowchart illustrating the flow of a process performed by the measure selecting apparatus 10. As illustrated in FIG. 15, in the measure selecting apparatus 10, first, the resource path extracting unit 151 extracts, from the resource data 142b, all of the resource paths and creates the resource path data 143a (Step S101). At this stage, in the resource path data 143a, items in the RTC column and the RTC per period column are blank.

Then, the affected-status determining unit 152 extracts all of the combinations of adverse event scenarios and resources; determines whether each resource is affected in a corresponding adverse event scenario; and creates the resource RT data 143c (Step S102). At this stage, in the resource RT data 143c, items in the improvement target column and the RT column are blank. Then, the vulnerability handling determining unit 153 extracts all of the combinations of resources and vulnerabilities; determines whether each vulnerability is handled; and creates the vulnerability handling status data 143b (Step S103).

Subsequently, the measure-selecting-process control unit 154 instructs the resource recovery time calculating unit 155 to calculate, in accordance with an unhandled vulnerability, RTs of resources that are set to be affected in the resource RT data 143c and then puts the calculated RTs in the RT column in the resource RT data 143c (Step S104). Thereafter, the measure-selecting-process control unit 154 selects a first period registered in the RTC per period data 142e (Step S105).

The measure-selecting-process control unit 154 instructs the RTC calculating unit 156 to calculate the RTC of each resource path included in the resource path data 143a (Step S106) and obtains the RTO of that period, i.e., the first period in this case, from the RTC per period data 142e (Step S107). At this stage, if an item in the RTC column in the resource path data 143a is blank, the measure-selecting-process control unit 154 sets, in the item of the RTC in the resource path data 143a, the RTC of each resource path calculated by the RTC calculating unit 156.

Then, the measure-selecting-process control unit 154 instructs the critical-path selecting unit 157 to select a critical path (Step S108) and compares the RTC of the selected critical path with the RTO of that period (Step S109). If the RTC of the critical path is equal to or greater than the RTO of that period (No at Step S110), the optimum measure selecting unit 158 updates, in accordance with an instruction from the measure-selecting-process control unit 154, the item of the improvement target in the resource RT data 143c and then extracts, as an improvement target, a resource that is included on a resource path in which an RTC exceeds an RTO of that period and that is to be affected in an adverse event scenario (Step S111).

Then, the optimum measure selecting unit 158 performs an optimum measure selecting process; selects one optimum measure from among measures that can be performed, in the period, to eliminate an unhandled vulnerability of the extracted resource; registers the selected measure in the measure data 143d; and reflects, in the resource RT data 143c, an improved RT obtained from that measure (Step S112). After one measure is selected in this way, the measure-selecting-process control unit 154 resume processing from Step S106.

In contrast, at Step S109, if an RTC of the critical path is less than the RTO of that period (Yes at Step S110), the optimum measure selecting unit 158 additionally sets, in the item of the RTC per period column in the resource path data 143a, the RTC of each resource path calculated by the RTC calculating unit 156 (Step S113) and then attempts to select the next period registered in the RTC per period data 142e (Step S114).

At this time, if the next period is selected (No at Step S115), the measure-selecting-process control unit 154 resumes a process from Step S106. In contrast, all of the periods have been selected and a next period thus cannot be selected (Yes at Step S115), the result output unit 159 outputs the content of the measure data 143d or the like and completes the series of processes.

Figure 16:
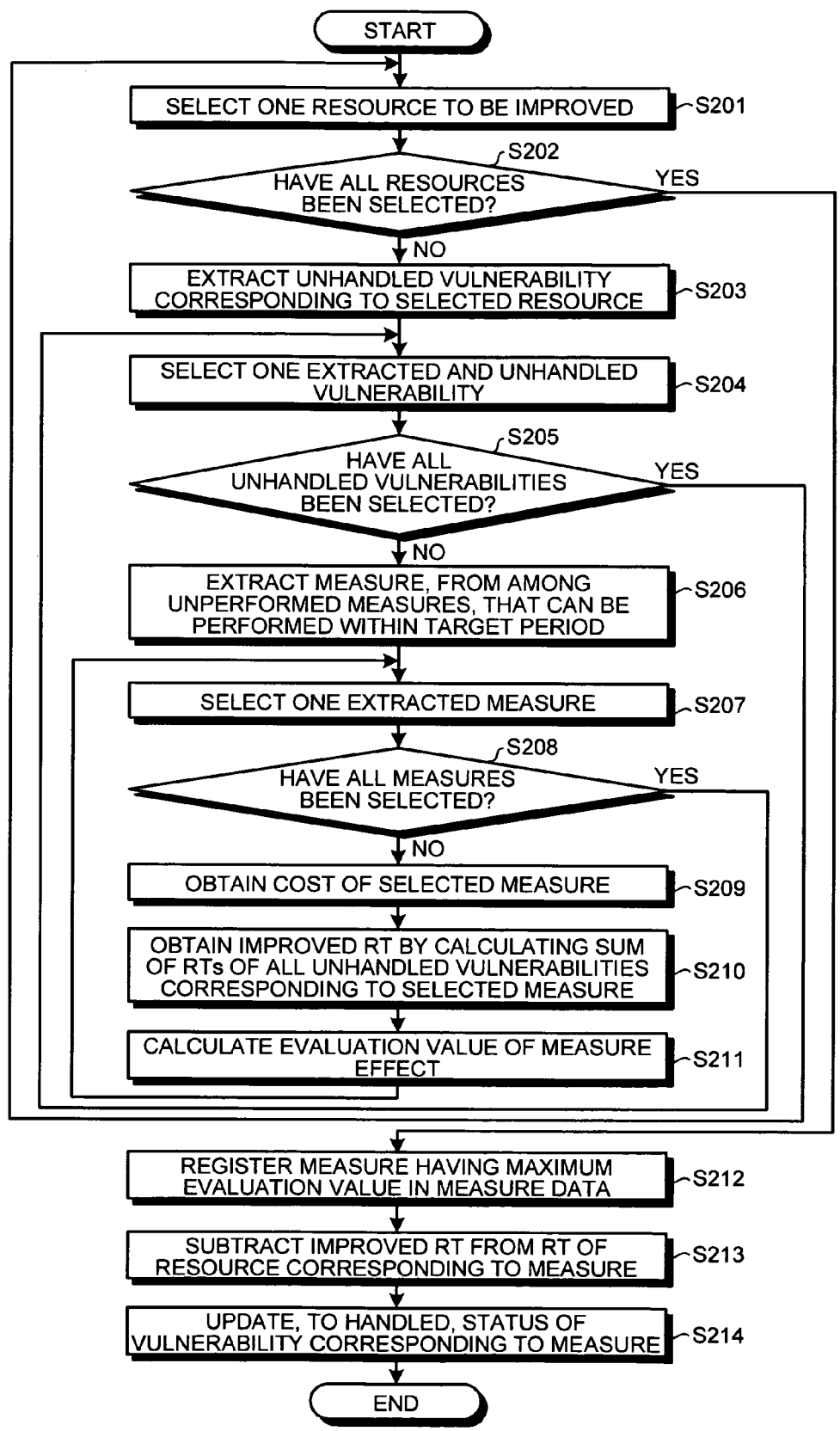
FIG. 16 is a flowchart illustrating the flow of an optimum measure selecting process.

FIG. 16 is a flowchart illustrating the flow of the optimum measure selecting process. As illustrated in FIG. 16, the optimum measure selecting unit 158 selects, from among resources extracted as improvement targets, one resource that has not been selected (Step S201). At this stage, if the optimum measure selecting unit 158 can select a resource that has not been selected (No at Step S202), the optimum measure selecting unit 158 extracts, from the vulnerability handling status data 143b, an unhandled vulnerability corresponding to the selected resource (Step S203).

Then, the optimum measure selecting unit 158 selects one extracted and unhandled vulnerability that has not been selected (Step S204). At this stage, if an unhandled vulnerability can be selected (No at Step S205), by referring to the measure master data 141c and the measure status data 142c, the optimum measure selecting unit 158 extracts, from among measures that have not been performed yet and that correspond to the selected and unhandled vulnerability, a measure that can be performed within the target period (Step S206). Furthermore, whether a measure can be performed within the period is determined by whether the target period includes a period that is obtained by adding the current date to a value that is set as an item in the period column in the measure master data 141c.

From Step S203 to Step S204, a process is performed by focusing on vulnerability as an example; however the embodiment is not limited thereto. For example, at Step S203, by referring to the measure status data illustrated in FIG. 7, it is also possible to extract an unhandled measure corresponding to the selected resource and to select, from among the extracted unhandled measures at Step S204, a measure that has not been selected.

Then, the optimum measure selecting unit 158 selects, from among the extracted measures that have not been performed, one measure that has not been selected (Step S207). At this stage, if a measure that has not been performed can be selected (No at Step S208), the optimum measure selecting unit 158 obtains, from the measure master data 141c, the cost of the measure (Step S209). Furthermore, by referring to the vulnerability handling status data 143b and the vulnerability master data 141b, the optimum measure selecting unit 158 calculates the sum of RTs associated with an unhandled vulnerability that is eliminated by the measure, thus obtaining a reduction improvement in the length of recovery time (hereinafter, referred to as "improved RT") (Step S210).

Then, the optimum measure selecting unit 158 calculates, in accordance with the obtained cost and the improved RT, an evaluation value of a measure effect (Step S211). The evaluation value E can be calculated using, for example, the equation below:

$$E = T/C$$

where T represents the improved RT and C represents the cost. If a cost is defined in accordance with a level, such as "high", "medium", and "low", C is arbitrarily set in accordance with the level. With this equation, it is possible to evaluate a measure effect from the viewpoint of cost-effectiveness. The equation used here is described as an example. For example, it is possible to calculate an evaluation value using either one of an improved RT and a cost. Alternatively, a value of the cost squared can be used to focus on a cost. Furthermore, by using a value of a period, it is also possible for an evaluation equation to obtain a high evaluation value for a measure that is completed in a short period of time.

After the evaluation value of one measure is calculated in this way, the optimum measure selecting unit 158 resumes processing from Step S207 and also calculates the evaluation value of another measure. Then, at Step S207, if all of the measures have been selected (Yes at Step S208), the optimum measure selecting unit 158 resumes processing from Step S204 and also calculates the evaluation value of a measure corresponding to another unhandled vulnerability. Thereafter, at Step S204, if all of the unhandled vulnerability have been selected (Yes at Step S205), the optimum measure selecting unit 158 resumes processing from Step S201 and also calculates the evaluation value of a measure corresponding to an unhandled vulnerability of another resource.

If all of the measures are evaluated and all of the resources to be improved are selected (Yes at Step S202), the optimum measure selecting unit 158 registers, in the measure data 143d, information on a measure having the maximum evaluation value (Step S212) and performs a process for updating the resource RT data 143c by subtracting an improved RT from the RT of a resource corresponding to that measure (Step S213). Then, in the handling status column in the vulnerability handling status data 143b, the optimum measure selecting unit 158 updates, to "handled", items of the handling status of vulnerabilities that have been eliminated by the measure (Step S214) and then completes the optimum measure selecting process.

The configuration of the measure selecting apparatus 10 according to the embodiment illustrated in FIG. 1 is not limited thereto. Various modifications are possible as long as they do not depart from the spirit of the present invention. For example, a function identical to that of the measure selecting apparatus 10 can be implemented by installing a function of the control unit 150 of the measure selecting apparatus 10 as software and causing a computer to execute the function. In the following, an example of a computer that executes a measure selecting program 1071 in which a function of the control unit 150 is installed as software will be described.

Figure 17:
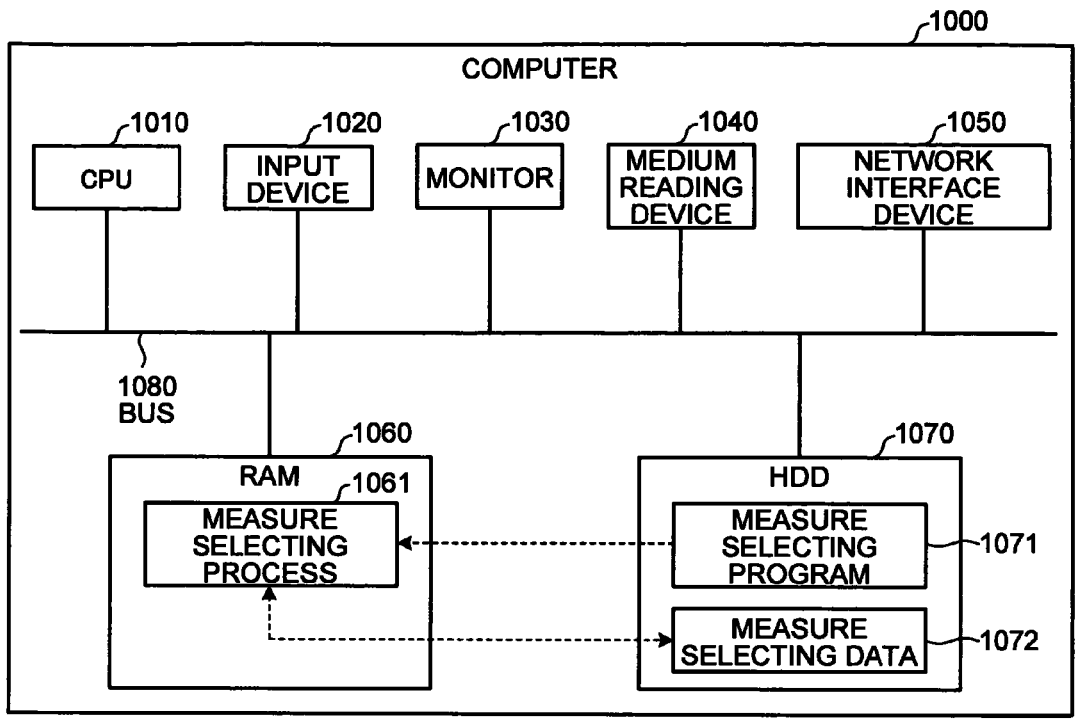
FIG. 17 is a functional block diagram illustrating a computer that executes a measure selecting program.

FIG. 17 is a functional block diagram illustrating a computer 1000 that executes the measure selecting program 1071. The computer 1000 includes a central processing unit (CPU) 1010 that executes various kinds of computing processing, an input device 1020 that receives data from a user, a monitor 1030 that displays various kinds of information, a medium reading device 1040 that reads program or the like from a recording medium, a network interface device 1050 that receives/transmits data between other computers via a network, a random access memory (RAM) 1060 that temporarily stores therein various kinds of information, and a hard disk drive 1070, which are all connected via a bus 1080.

In the hard disk drive 1070, the measure selecting program 1071 that has a function identical to that of the control unit 150 illustrated in FIG. 1 and measure selecting data 1072 corresponding to the various kinds of data stored in the storing unit 140 illustrated in FIG. 1 are stored. Furthermore, the measure selecting data 1072 can, when appropriate, be separated and stored in another computer that is connected to via a network.

The CPU 1010 reads the measure selecting program 1071 from the hard disk drive 1070 and expands it in the RAM 1060, whereby the measure selecting program 1071 functions as a measure selecting process 1061. Then, the measure selecting process 1061 expands, in an area allocated to the measure selecting process 1061 in the RAM 1060, information or the like that is read from the measure selecting data 1072 and executes various kinds of data processing in accordance with the expanded data or the like.

The measure selecting program 1071 is not necessarily stored in the hard disk drive 1070. For example, the computer 1000 can read the program stored in the storage medium such as a CD-ROM and executes it. Alternatively, the measure selecting program 1071 can be stored in, for example, another computer (or a server) that is connected to the computer 1000 via a public circuit, the Internet, a local area network (LAN), a wide area network (WAN), or the like and the computer 1000 then reads and executes the program from the above.

As described above, with the embodiment, by extracting a resource path constituting the influence diagram to improve the recovery time in accordance with a path, the overall recovery time can be improved. Accordingly, even though the contents of business represented in the influence diagram is complicated, it is possible to effectively select an optimum combination of measures.

According to an aspect of the present invention, because measures are evaluated in accordance with the cost-effectiveness, an advantage is provided in that it is possible to select an excellent measure having the best cost-effectiveness.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer readable storage medium having stored therein a measure selecting program, the measure selecting program causing a computer to execute a process comprising:

(a) determining whether a vulnerability of a resource employed in a predetermined task has been addressed based on
  (i) a first set of information defining a correspondence between a resource, a vulnerability of the resource, and a recovery time of the resource from a failure caused by the vulnerability,
  (ii) a second set of information defining a correspondence between the vulnerability defined in the first set of information and one or more measures for eliminating the vulnerability,
  (iii) a third set of information defining if each measure defined in the second set of information has been performed, and
  (iv) a fourth set of information defining the resource employed in a predetermined task, (b) evaluating based on a predetermined criteria, when the vulnerability of the resource is determined not to have been addressed, and when a recovery time defined in the first set of information corresponding to the resource is longer than a predetermined time, the one or more measures defined in the second set of information corresponding to the vulnerability determined not to have been addressed, to calculate an evaluation value of each of the measures, the evaluating
  calculates a sum of recovery times for each resource path which is obtained by linking the resources employed for the predetermined task from a highest level to a lowest level according to a dependency relation,
  extracts a resource (A) which is included in the resource path for which the sum of recovery times is highest and exceeds a predetermined value, and (B) for which (a) the determining determines that the vulnerability has not been addressed, and
  evaluates, based on the predetermined criteria, the one or more measures for eliminating the vulnerability; and (c) selecting a measure with a highest evaluation value.

2. The non-transitory computer readable storage medium according to claim 1, wherein the second set of information further defines a correspondence between a period required for performing the measure, the measure, and the vulnerability, and (c) the selecting includes selecting a measure by referring to a period defined corresponding to each of the measures in the second set of information.

3. The non-transitory computer readable storage medium according to claim 1, wherein the selecting includes selecting a measure based on a sum of recovery times defined in the first set of information corresponding to the resource whose vulnerability is determined not to have been addressed.

4. A measure selecting apparatus comprising:
a memory; and
a processor which is coupled to the memory, wherein
the memory stores therein
   (i) a first set of information defining a correspondence between a resource, a vulnerability of the resource, and a recovery time of the resource from a failure caused by the vulnerability;
   (ii) a second set of information defining a correspondence between the vulnerability defined in the first set of information and one or more measures for eliminating the vulnerability;
   (iii) a third set of information defining if each measure defined in the second set of information has been performed; and
   (iv) a fourth set of information defining the resource employed in a predetermined task; and
the processor is programmed to perform a process comprising
   (a) determining, based on the first set of information, the second set of information, the third set of information, and the fourth set of information, whether a vulnerability of a resource employed in a predetermined task has been addressed; and
   (b) evaluating based on a predetermined criteria, when the vulnerability of the resource is determined not to have been addressed, and when a recovery time defined in the first set of information corresponding to the resource is longer than a predetermined time, the one or more measures defined in the second set of information corresponding to the vulnerability determined not to have been addressed, to calculate an evaluation value of each of the measures, the evaluating
calculates a sum of recovery times for each resource path which is obtained by linking the resources employed for the predetermined task from a highest level to a lowest level according to a dependency relation,
extracts a resource (A) which is included in the resource path for which the sum of recovery times is highest and exceeds a predetermined value, and (B) for which (a) the determining determines that the vulnerability has not been addressed, and
evaluates, based on the predetermined criteria, the one or more measures for eliminating the vulnerability; and
   (c) selecting a measure with a highest evaluation value.

5. The measure selecting apparatus according to claim 4, wherein
the second set of information further defines a correspondence between a period required for performing the measure, the measure, and the vulnerability, and (c) the selecting selects a measure by referring to a period defined corresponding to each of the measures in the second set of information.

6. The measure selecting apparatus according to claim 4, wherein the selecting selects a measure based on a sum of recovery times defined in the first set of information corresponding to the resource whose vulnerability is determined not to have been addressed.

7. A measure selecting method comprising:
   (a) determining, by a computer, whether a vulnerability of a resource employed in a predetermined task has been addressed based on
      (i) a first set of information defining a correspondence between a resource, a vulnerability of the resource, and a recovery time of the resource from a failure caused by the vulnerability,
      (ii) a second set of information defining a correspondence between the vulnerability defined in the first set of information and one or more measures for eliminating the vulnerability,
      (iii) a third set of information defining if each measure defined in the second set of information has been performed, and
      (iv) a fourth set of information defining the resource employed in a predetermined task,
   (b) evaluating, by the computer, based on a predetermined criteria, when the vulnerability of the resource is determined not to have been addressed, and when a recovery time defined in the first set of information corresponding to the resource is longer than a predetermined time, the one or more measures defined in the second set of information corresponding to the vulnerability determined not to have been addressed, to calculate an evaluation value of each of the measures, the evaluating
calculates a sum of recovery times for each resource path which is obtained by linking the resources employed for the predetermined task from a highest level to a lowest level according to a dependency relation,
extracts a resource (A) which is included in the resource path for which the sum of recovery times is highest and exceeds a predetermined value, and (B) for which (a) the determining determines that the vulnerability has not been addressed, and
evaluates, based on the predetermined criteria, the one or more measures for eliminating the vulnerability; and
   (c) selecting, by the computer, a measure with a highest evaluation value.

8. The measure selecting method according to claim 7, wherein
the second set of information further defines a correspondence between a period required for performing the measure, the measure, and the vulnerability, and (c) the selecting includes selecting a measure by referring to a period defined corresponding to each of the measures in the second set of information.

9. The measure selecting method according to claim 7, wherein the selecting includes selecting a measure based on a sum of recovery times defined in the first set of information corresponding to the resource whose vulnerability is determined not to have been addressed.

\* \* \* \* \*

UNITED STATES PATENT AND TRADEMARK OFFICE
CERTIFICATE OF CORRECTION

PATENT NO. : 8,539,588 B2
APPLICATION NO. : 12/923409
DATED : September 17, 2013
INVENTOR(S) : Takashi Tada et al.

It is certified that error appears in the above-identified patent and that said Letters Patent is hereby corrected as shown below:

In the Claims:

In Col. 17, Line 3, In Claim 2, after "measure," delete "the measure,".
In Col. 17, Line 62, In Claim 5, after "measure," delete "the measure,".
In Col. 18, Line 53, In Claim 8, after "measure," delete "the measure,".

Signed and Sealed this
Seventh Day of January, 2014

Margaret A. Focarino
*Commissioner for Patents of the United States Patent and Trademark Office*